United States Patent [19]
Keller

[11] Patent Number: 5,859,532
[45] Date of Patent: Jan. 12, 1999

[54] METHOD OF AND MEASURING ARRANGEMENT FOR METAL DETECTION WITH A COIL DEVICE HAVING SEVERAL SEPARATELY CONTROLLABLE REGIONS

[75] Inventor: Helmut Keller, Tuebingen, Germany

[73] Assignee: Vallon GmbH, Eningen, Germany

[21] Appl. No.: 551,651

[22] Filed: Nov. 1, 1995

[30] Foreign Application Priority Data

Mar. 23, 1995 [DE] Germany ............... 195 10 506.0

[51] Int. Cl.$^6$ ............... G01N 27/72; G01R 33/12; G01V 3/11; G01V 3/38
[52] U.S. Cl. ............... 324/232; 324/243; 340/551
[58] Field of Search ................... 324/232, 243, 324/262; 340/572, 551, 552

[56] References Cited

U.S. PATENT DOCUMENTS

| | | |
|---|---|---|
| 4,605,898 | 8/1986 | Aittoniemi, et al. . |
| 4,866,424 | 9/1989 | Parks . |
| 5,443,517 | 8/1995 | Frazier .................. 340/551 |

FOREIGN PATENT DOCUMENTS 0323713  12/1988  European Pat. Off. .

OTHER PUBLICATIONS

Patent Abstracts of Japan/Pub. # 60239682.
Fachzeitschrift Frequenz, 22 (1968) 10, pp. 300–305, Claus Colani, "Ein Neuartiges Metallsuchgeraet nach dem Pulsverfahren fuer grosse Gelaendeflaechen mit elektronischer Objektanalyse und –auswahl". (no translation).

*Primary Examiner*—Walter E. Snow
*Attorney, Agent, or Firm*—Michael J. Striker

[57] ABSTRACT

In a method and a measuring device for metal detection with the use of a coil arrangement the spatially offset transmitting coils are controlled with pulse sequences of different pulse patterns. The receiving coils associated with the transmitting coils are scanned with respect to the received measuring signals with a scan pattern corresponding to the respective associated pulse pattern. It is therefore possible to control simultaneously all transmitting coils and to provide a spatial determination of a metal object located in a throughgoing region of a gate frame.

6 Claims, 4 Drawing Sheets

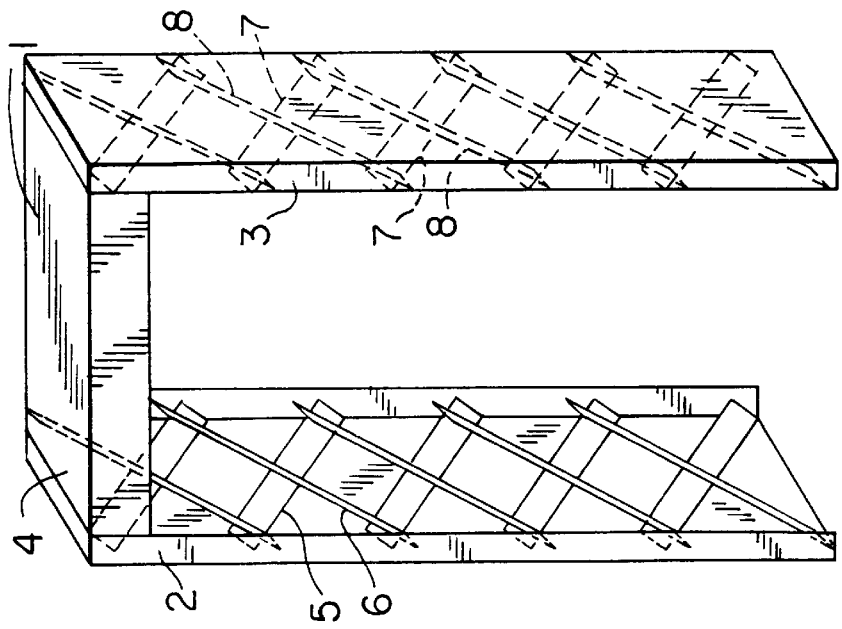
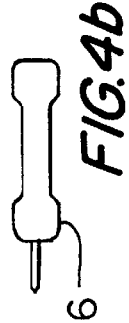
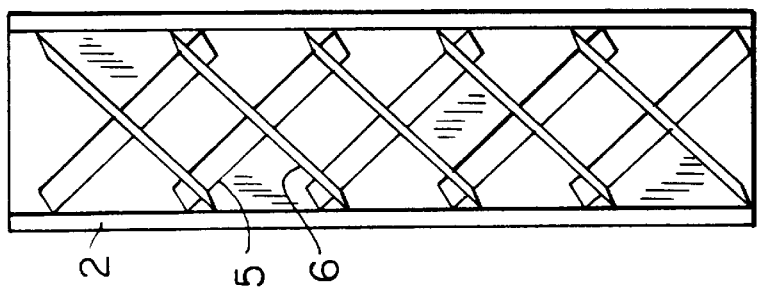
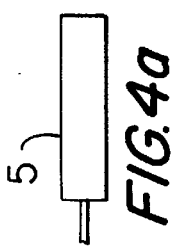

METHOD OF AND MEASURING ARRANGEMENT FOR METAL DETECTION WITH A COIL DEVICE HAVING SEVERAL SEPARATELY CONTROLLABLE REGIONS

BACKGROUND OF THE INVENTION

The present invention relates to a method of metal detection by means of a coil device having several, separately controllable regions, as well as to a measuring device for the metal detection.

For the purpose of monitoring safety in airports, gate frames are used which are provided with coil devices in the lateral parts of the frame for metal detection. When people pass through the gate frames, it is therefore possible to check whether the people are carrying metal objects with them. If a metal object is detected, the measuring device which is connected with the coil device of the gate frame releases an acoustic and/or visual signal.

In order not only to determine the presence of a metal object but also to provide a signal where the fixed metal object is located in the space enclosed by the gate frame, the coil device is provided with different, separately controllable regions. The transmitting coil and the receiving coil having different regions can be controlled or evaluated separately so that it can be determined in which spatial region a detected metal object is located. The control of the different transmitter coils in such a coil arrangement may be offset in time in order to enable a spatial association with respect to the received measuring signal. The timely offset control of the different transmitting coils has however the disadvantage that always only that spatial region inside the gate frame is monitored whose associated transmitting coil is directly controlled. If a person moves relatively fast through the gate frame a metal object which is carried with him can be not detected since it can move through a spatial region for the associated transmitting coil is not directly controlled. If for example in a certain space five metal detectors are used each provided with 20 coils, the pulse repeat rate of each coil is reduced by the factor 5×20=100 for an individual coil arrangement. The power/noise ratio is therefore worsened by the factor √100=10.

A known measuring process with electronic object analysis is disclosed in the article "Ein neuartiges Metallsuchgerät nach dem Pulsverfahren für grosse Gelände-flächen mit elektronischer Objektanalyse und -auswahl" in Fachzeitschrift Frequenz, 22 (1968) 10, pages 300–305.

SUMMARY OF THE INVENTION

Accordingly, it is an object of the present invention to provide a method of metal detection by means of a coil device as well as a measuring device, which avoids the disadvantages of the prior art.

More particularly, it is an object of the present invention to provide a method for metal detection by means of a coil device in which the coils operating as transmitting coils are simultaneously controlled, wherein the receiving signals at the receiving side can be associated with the different transmitting coils.

In keeping with these objects and with others which will become apparent hereinafter, one feature of the present invention resides, briefly stated, in a method of metal detection by a coil device having several spatially offset coils with several, separately controllable regions for producing magnetic fields, with the coils including transmitting coils and receiving coils controllable or inquireable individually by a measuring electronic circuit for detection of metal objects, wherein in accordance with the present invention the several coils are controlled simultaneously with pulse sequences having different pulse patterns, and the pulse sequences received by these and the remaining coils are scanned and evaluated with scan patterns which correspond to the pulse patterns of the pulse frequency of the different transmitting coils.

The transmitting coils which for example are arranged in a gate frame spatially offset and preferably overlapping are controlled with pulse sequences of different pulse patterns simultaneously. The received measuring signals are scanned and digitalized. If a transmitting coil is controlled for example with a pulse frequency which has a first positive pulse, and second positive pulse, a third negative pulse and a fourth negative pulse, then at a receiving side by a corresponding weighing of the four measuring values with the same pattern an evaluation of the measuring signals caused by this transmitting coil is performed. The transmitted pulse frequency can be a binary coded pulse pattern, and so that a characteristic pulse pattern is associated with each transmitting coil. By the binary coding of the signal radiated from the transmitting coil it is possible to provide an association of the measuring signal at a receiving side with the different transmitting coils and thereby to the associated special regions within the gate frame.

It is especially advantageous when the pulse sequence is assembled of a sequence of $2^n$ (n=1, 2, ...) double pulses wherein each double pulse is composed of a positive and a negative individual pulse. This has the advantage that a special simple association of the measuring signal of a receiving coil with the transmitting coil is provided. The whole pulse sequence has a same number of positive and negative individual pulses.

The present invention also deals with a measuring device provided with transmitting and receiving coils in which the transmitting coils are controllable with different pulse sequences and the receiving measuring signals can be associated with the different transmitting coils.

For this purpose in the inventive measuring device each coil acting as a transmitting coil is associated with the coil control, the coil control is controllable by a central control unit, the transmitting coils are formed as coils associated with the receiving coils and supplying the receiving signal to a scanning circuit which scans the received signal with a scanning pattern corresponding to the pulse pattern at a transmitting side, the scanning circuit associated with the receiving coils at the outer side are connected with an input of a multiplexer which supplies the scanned value of the scanning circuits in a time multiplex process through an analog-digital converter to a processor which evaluates the scan values and supplies a measuring result to an indicating device.

With such a device a scanning circuit is associated with each receiving coil and produces one or several scanning values from the receiving signal. Through a multiplexer, the scanned values can be processed in accordance with an A/D conversion in a microprocessor, and indicated visually and acoustically.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a gate frame with transmitting/receiving coils arranged crosswise in its frame sides, in accordance with the present invention;

FIG. 2 is a side view of the gate frame of FIG. 1;

FIG. 3 is a view showing a small surface of a frame side of the gate frame of FIG. 1;

FIGS. 4A and 4B are views showing individual coil shapes which are used for transmitting/receiving coils in the gate frames of FIG. 1;

DESCRIPTION OF THE PREFERRED EMBODIMENTS

Figure 5:
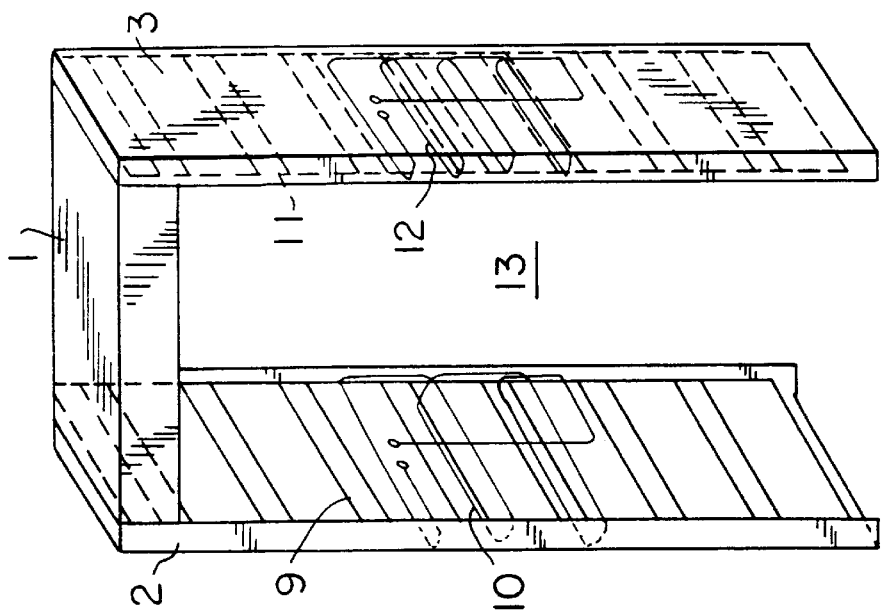
FIG. 5 is a view showing a gate frame with a coil arrangement having overlapping transmitting/receiving coils.

A gate frame 1 shown in FIG. 1 has two frame side parts 2 and 3 and an upper frame part 4. Coils 5 and 6 which act as transmitting coils are arranged in the left frame side part 2 while coils 7 and 8 acting as receiving coils are arranged on the right frame side part 3. Coils 5, 6 and 7, 8 are arranged crosswise and overlapping with one another. The coils of each side part are arranged not only crosswise but standing orthogonally on one another. In other words, the coil 5 is located flat in the frame side part 2, while the coil 6 extends perpendicular to the coil 5 and engages over the coil 5. Possible shapes of the coil are shown in FIG. 4.

Figure 9:
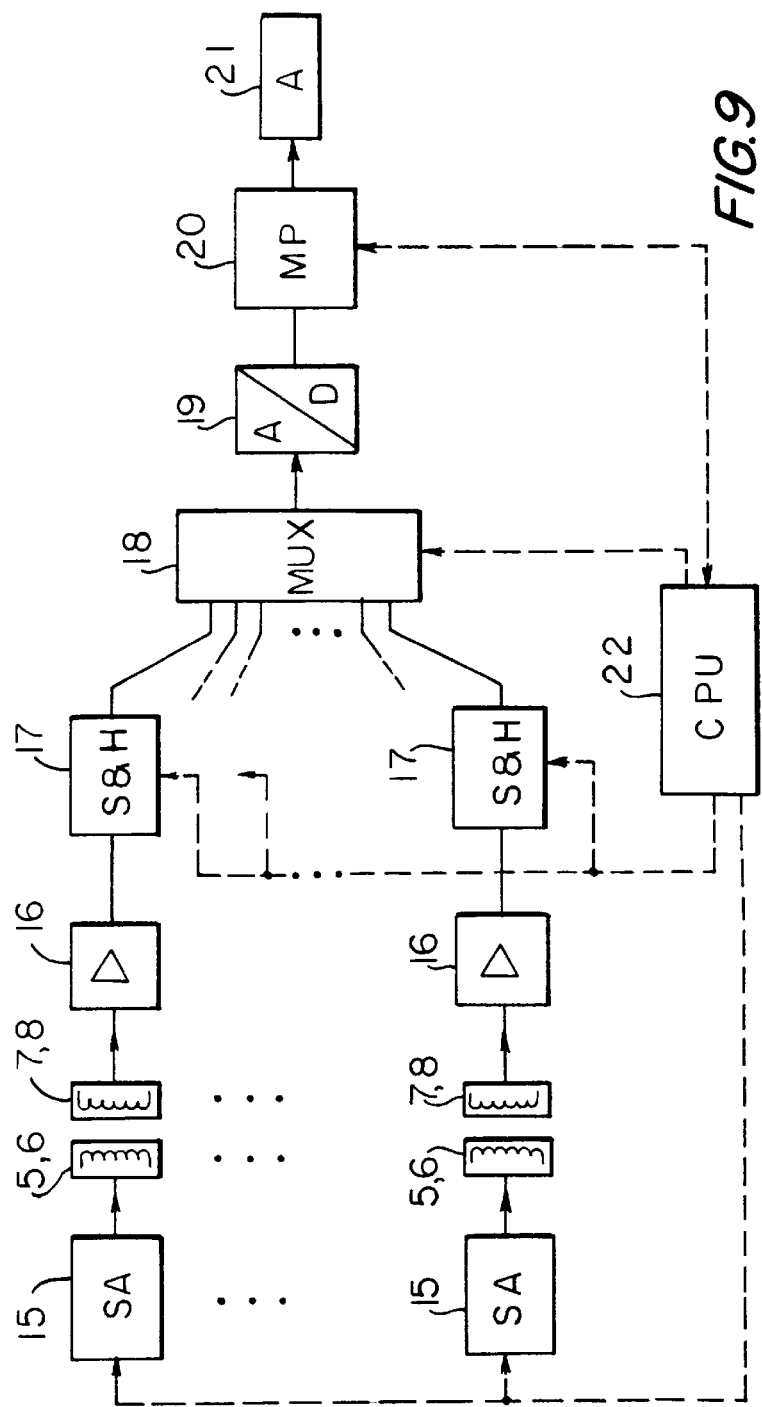
FIG. 9 is a block diaphragm of a measuring device in accordance with the present invention.

For the sake of simplicity, in FIG. 9 the coils 5, 6 are shown as transmitting coils and the coils 7, 8 are shown as receiving coils. Generally, however, both coils 5, 6 and 7, 8 can be used as transmitting coils as receiving coils, as long as corresponding control means and measuring devices are associated with the coils. For example, a signal produced by a transmitting coil can be received as a measuring signal in this coil, when the same coil is connected both with a coil control 15 and a signal amplifier 16 and further devices required for evaluation. For the sake of simplicity, this double function as a transmitting and a receiving coil is graphically not shown in FIG. 9.

FIGS. 2 and 3 show the orientation of the coils on different views, to clarify the arrangement of the coils and the corresponding frame side parts.

The gate frame 1 shown in FIG. 5 also has overlapping transmitting coils 9, 10 and receiving coils 11, 12. The coils 9, 11 can be identified as flat coils, while the transmitting coil 10 and the receiving coil 12 are formed as torroidal coils oriented octagonally to them. FIG. 5 shows only one transmitting coil 10 and one receiving coil 12. However, several torroidal coils are distributed over the whole length of the frame side parts 2, 3.

Figure 6:
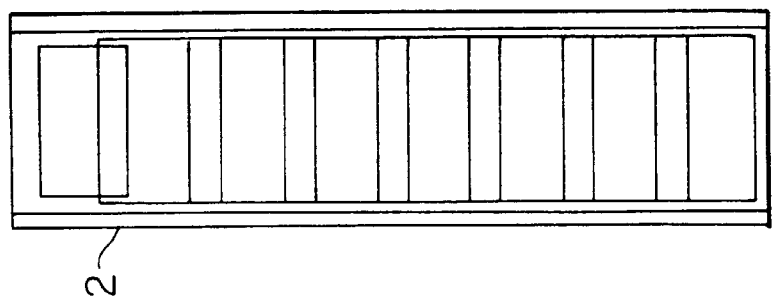
FIG. 6 is a side view of the gate frame of FIG. 5.
Figure 7:
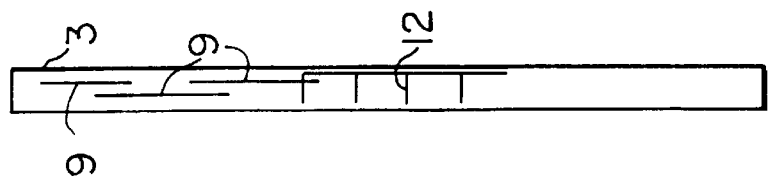
FIG. 7 is a view showing a small surface of a frame side of the gate frame of FIG. 5.

FIG. 6 does not a torroidal coil, while FIG. 7 shows a torroidal coil in form of the receiving coil 12.

Figure 8:
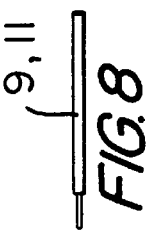
FIG. 8 is a view showing a flat coil used in the gate frames of FIG. 5.

FIG. 8 shows the transmitting coil 9 and the receiving coil 11 formed as a flat coil. The torroidal coils, in particular the transmitting coil 10 and the receiving coil 12, are responsible for generation of the perpendicular field course in the throughgoing region 13 of the gate frame 1. The transmitting coils 9 formed as the flat coils are used in particular for producing a horizontal field component in the throughgoing region 13.

The block diagram shown in FIG. 9 illustrates the inventive measuring device. The measuring device has several transmitting/receiving units each including a coil control 15, transmitting and receiving coils 5, 6 and 7, 8, a signal amplifier 16 and a scanning circuit 17. The scanning circuits 17 which in a simple case are formed as sample-and-hold circuits are connected at their outlet side with a multiplexer 18 which delivers the scanned values through an analog-digital converter 19 to a microprocessor 20. The microprocessor evaluates the digitalized scanned values and supplies a measuring result which can be indicated visually and/or acoustically by an indicating device 21.

FIG. 9 shows only the first and the last transmitting/receiving units. Totally, the number of the transmitting and receiving units corresponds to the number of the coils 5, 6 and 7, 8 in the gate frame. The sensing values at the scanning devices 17 are simultaneously transmitted through the multiplexer 18 in the time multiplexing process to the analog-digital converter 19. The control of the coil control elements 15 and the further units of the measuring device is performed by a central control unit 22. For this purpose it is connected through control conductors shown by broken lines with the different units of the measuring device.

Figure 10:
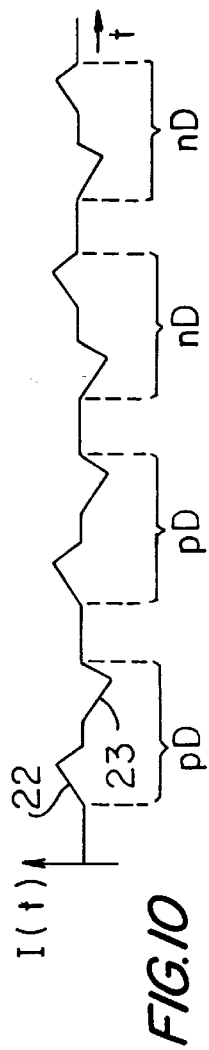
FIG. 10 is a view showing a pulse sequence for controlling a transmitting coil, composed of four double pulses.

FIG. 10 shows a time course of a pulse sequence with which a transmitting coil 5 can be controlled. The pulse sequence includes four double pulses, with each double pulse composed of a positive and a negative individual pulse 22 and 23, correspondingly. A double pulse which starts with a positive individual pulse 22 is identified as a positive double pulse pD while a double pulse which starts with a negative individual pulse is identified as a negative double pulse nD. The illustrated pulse sequence therefore is pD—pD—nD—nD. Moreover, the condition must be satisfied that with two different pulse sequences, on the half of locations coincident double pulses are present and on the half of locations non-coincident double pulses are present.

A simplified example of the different binary coding of the pulse sequences is presented hereinbelow.

Example

Four transmitting coils and four receiving coils are arranged in a gate frame. The transmitting coils are loaded with the following pulse sequences:

1. Transmitting coil: pD–pD–pD–pD
2. Transmitting coil: pD–nD–pD–nD
3. Transmitting coil: pD–pD–nD–nD
4. Transmitting coil: pD-nD-nD-pD The scanner circuit 17 scans the pulse word which is received from the receiving coils 7, 8.

The subsequent tables 1 and 2 show, on the one hand, the scanning values $M_{ik}$ (Table 1) and on the other side a computation diagram for computing the transmitting-receiving path value from the scanned values (Table 2). The transmitting-receiving path values are identified in Table 2 with $SEP_{ik}$.

TABLE 1

|  | 1. Double Pulse | 2. Double pulse | 3. Double pulse | 4. Double pulse |
|---|---|---|---|---|
| 1. Receiving Coil | $M_{1,1}$ | $M_{1,2}$ | $M_{1,3}$ | $M_{1,4}$ |
| 2. Receiving Coil | $M_{2,1}$ | $M_{2,2}$ | $M_{2,3}$ | $M_{2,4}$ |
| 3. Receiving Coil | $M_{3,1}$ | $M_{3,2}$ | $M_{3,3}$ | $M_{3,4}$ |
| 4. Recieving Coil | $M_{4,1}$ | $M_{4,2}$ | $M_{4,3}$ | $M_{4,4}$ |

TABLE 2

|  |  | 1. Transmitting Coil (++++) | 2. Transmitting Coil (+−+−) | 3. Transmitting Coil (++−−) | 4. Transmitting Coil (+−−+) |
|---|---|---|---|---|---|
| 1. | Receiving Coil | $SEP_{1,1} = M_{1,1} + M_{1,2} + M_{1,3} + M_{1,4}$ | $SEP_{1,2} = M_{1,1} + M_{1,2} + M_{1,3} + M_{1,4}$ | $SEP_{1,3} = M_{1,1} + M_{1,2} + M_{1,3} + M_{1,4}$ | $SEP_{1,4} = M_{1,1} + M_{1,2} + M_{1,3} + M_{1,4}$ |
| 2. | Receiving Coil | $SEP_{2,1} = M_{2,1} + M_{2,2} + M_{2,3} + M_{2,4}$ | $SEP_{2,2} = M_{2,1} + M_{2,2} + M_{2,3} + M_{2,4}$ | $SEP_{2,3} = M_{2,1} + M_{2,2} + M_{2,3} + M_{2,4}$ | $SEP_{2,4} = M_{2,1} + M_{2,2} + M_{2,3} + M_{2,4}$ |
| 3. | Receiving Coil | $SEP_{3,1} = M_{3,1} + M_{3,2} + M_{3,3} + M_{3,4}$ | $SEP_{3,2} = M_{3,1} + M_{3,2} + M_{3,3} + M_{3,4}$ | $SEP_{3,3} = M_{3,1} + M_{3,2} + M_{3,3} + M_{3,4}$ | $SEP_{3,3} = M_{3,1} + M_{3,2} + M_{3,3} + M_{3,4}$ |
| 4. | Receiving Coil | $SEP_{4,1} = M_{4,1} + M_{4,2} + M_{4,3} + M_{4,4}$ | $SEP_{4,2} = M_{4,1} + M_{4,2} + M_{4,3} + M_{4,4}$ | $SEP_{4,3} = M_{4,1} + M_{4,2} + M_{4,3} + M_{4,4}$ | $SEP_{4,4} = M_{4,1} + M_{4,2} + M_{4,3} + M_{4,4}$ |

In the Table 1 the expression $M_{i,k}$ means the measuring voltage at the scanning circuit of the i-th transmitting-receiving unit after the k-th double pulse. Thus, for example $M_{3,2}$ identifies the voltage value at the output of the scanning circuit of the third transmitting-receiving unit after the second double pulse.

In Table 2 the expression $SEP_{i,k}$ identifies the transmitting-receiving path which is formed by the i-th transmitting coil and the k-th receiving coil. Therefore, for example the value $SEP_{3,2}$ contains the information which is formed by the transmitting pulse of the second coil and the scanning value of the third coil. The sign sequence in the Table 2 under the transmitting coils, for example +−+− represents the sign of the double pulse of the corresponding pulse sequence.

If no metal object is located in the throughgoing region of the gate frame, all scanned values produce together a zero signal. When, however, a metallic object is brought in the region of the gate frame in which the field is generated, the transmitting-receiving path value changes in the region of the transmitting-receiving path, in which the metal object is located. Therefore, it can be determined where the metal object is located.

Figure 11A:
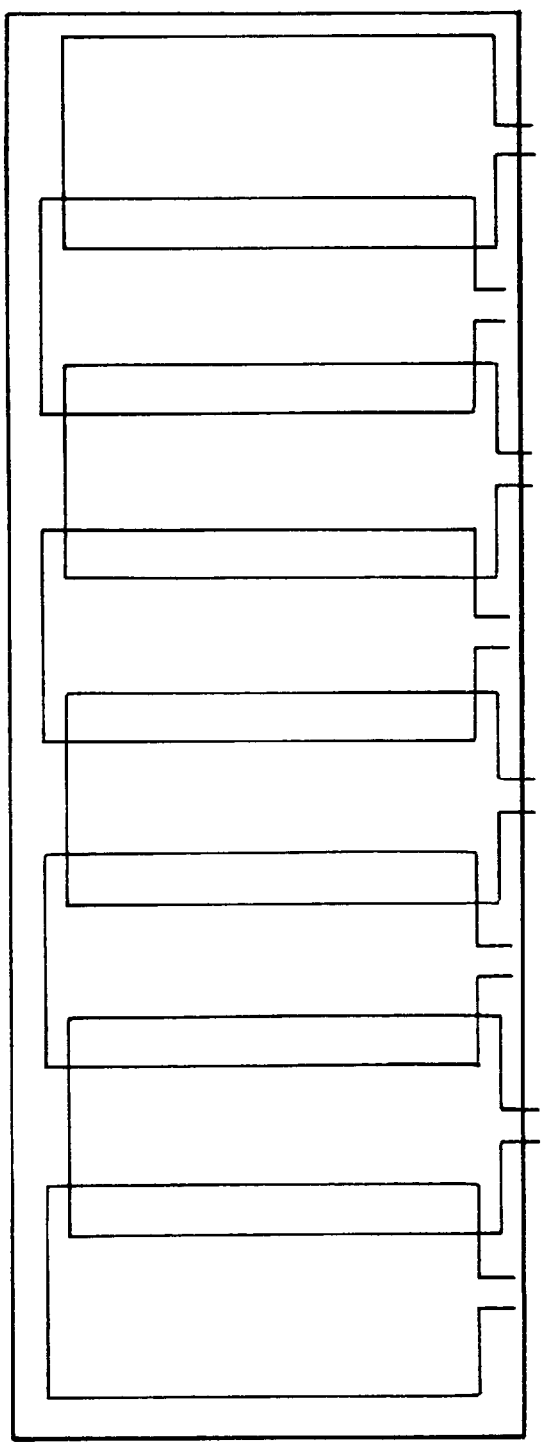
FIG. 11A and 11B are a plan view and a side view of a portable flat coil device.
Figure 11B:
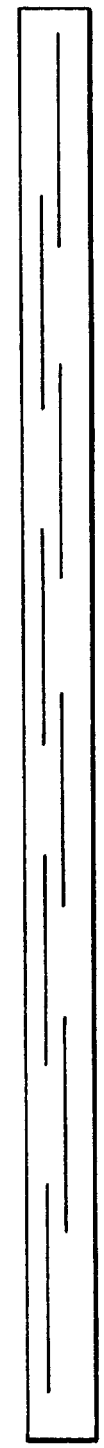

It should be mentioned that the inventive solution can be used not only in gate frames for personal control, but also for example in movable metal detectors which detect metal objects located in the ground region. The coil device is arranged then in a single supporting frame, and the coils are used for example both as transmitting coils and receiving coils. Such a coil arrangement which can be identified as a flat coil arrangement is shown in FIG. 11.

It will be understood that each of the elements described above, or two or more together, may also find a useful application in other types of constructions differing from the types described above.

While the invention has been illustrated and described as embodied in a method of and measuring arrangement for metal detection with a coil device having several separately controllable regions, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A method of metal detection with a coil device including several spatially offset coils with several, separately controllable regions for producing magnet fields, with the coils forming transmitting coils and receiving coils, the method comprising the steps of controlling the transmitting and receiving coils individually for detection of metal objects via measuring electronic means; controlling several of the coils simultaneously with pulse sequences of different pulse patterns, with the condition that with two different pulse sequences on one half of locations coincident pulses are present and on another half of locations non-coincident pulses are present; scanning pulse sequences received by the several coils and remaining coils; and evaluating the scanned pulse sequences with scan patterns corresponding to pulse patterns of the pulse sequences of the different transmitting coils.

2. A method as defined in claim 1; and further comprising the step of forming the pulse pattern of the pulse sequences at a transmitting side of several successively following double pulses, with each double pulse composed of a positive individual pulse and a negative individual pulse which is timely offset relative to the positive individual pulse.

3. A method as defined in claim 2, wherein the double pulses within a pulse sequence each start with a negative individual pulse are identified as a negative double pulses, while the double pulses which start with a positive individual pulse are identified as positive double pulses, and a characteristic pulse pattern which belongs to one pulse sequence is characterized by an individual sequence of positive and negative double pulses.

4. A method as defined in claim 3, wherein the pulse sequences have different binary coded pulse sequences.

5. A method as defined in claim 1; and further comprising the step of controlling several, synchronized protection devices by correspondingly several different pulse sequences so that an opposite influence is prevented.

6. A measuring device for detecting metal objects, comprising a plurality of transmitting and receiving coils arranged in a gate frame; a plurality of coil control elements each associated with a respective one of said transmitting coils; a sample control unit which controls said coil control elements so that several of the coils are controlled simultaneously with the condition that with two different pulse sequences on one half of locations coincident pulses are present and on another half of locations non-coincident pulses are present; a scanning circuit to which said receiving coils supply signals received from said transmitting coils and which scan the received signals with a scanning pattern corresponding to a pulse pattern at a transmitting side; a multiplexer having an inputer connected with output side of said scanning circuits associated with said receiving coils; an analog-digital converter and a processor arranged so that the scanned values of said scanning circuits are supplied in a time multiplex process through said analog-digital converter to said proccessor which evaluated the scanned values and produces a measuring result; and an indicating device which receives the measuring result.

* * * * *